United States Patent [19]

Nothdurft

[11] 4,188,743
[45] Feb. 19, 1980

[54] FISHING LURE

[76] Inventor: Carl Nothdurft, 22412 LaVon, St. Clair Shores, Mich. 48080

[21] Appl. No.: 837,856

[22] Filed: Sep. 29, 1977

[51] Int. Cl.² .............................................. A01K 85/00
[52] U.S. Cl. ................................................. 43/42.15
[58] Field of Search ..................... 43/42.15, 42, 42.11

[56] References Cited

U.S. PATENT DOCUMENTS

| | | | |
|---|---|---|---|
| 2,559,542 | 7/1951 | Mintner | 43/42.15 X |
| 2,607,151 | 8/1952 | Morris et al. | 43/42.15 X |
| 3,165,857 | 1/1965 | Koziba | 43/42.15 |

Primary Examiner—James G. Smith

Attorney, Agent, or Firm—William L. Fisher

[57] ABSTRACT

Improvement in a fishing lure having a molded body part having a projecting attaching loop, the improvement comprising the attaching loop being a wire member formed into a loop portion and having free end portions forming two legs, the legs being bent in the same direction at right angles to the plane of the loop portion, the legs being coined to enlarge them in the plane in which they are disposed, the attaching loop including the coined ends on the two legs and the two right angled bends therein being embedded in the body part during the molding thereof to enhance the retention of the attaching loop in the body part.

5 Claims, 10 Drawing Figures

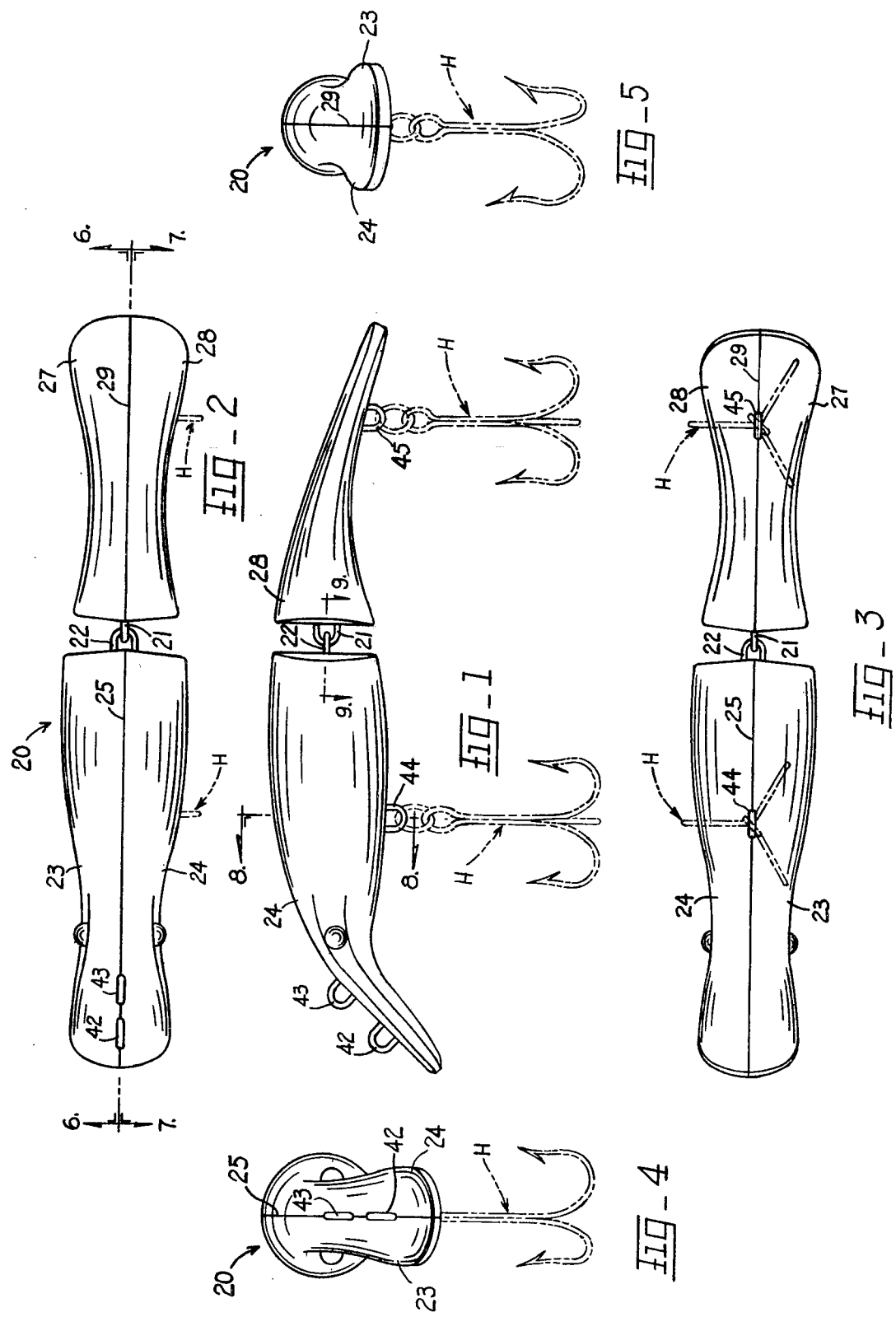

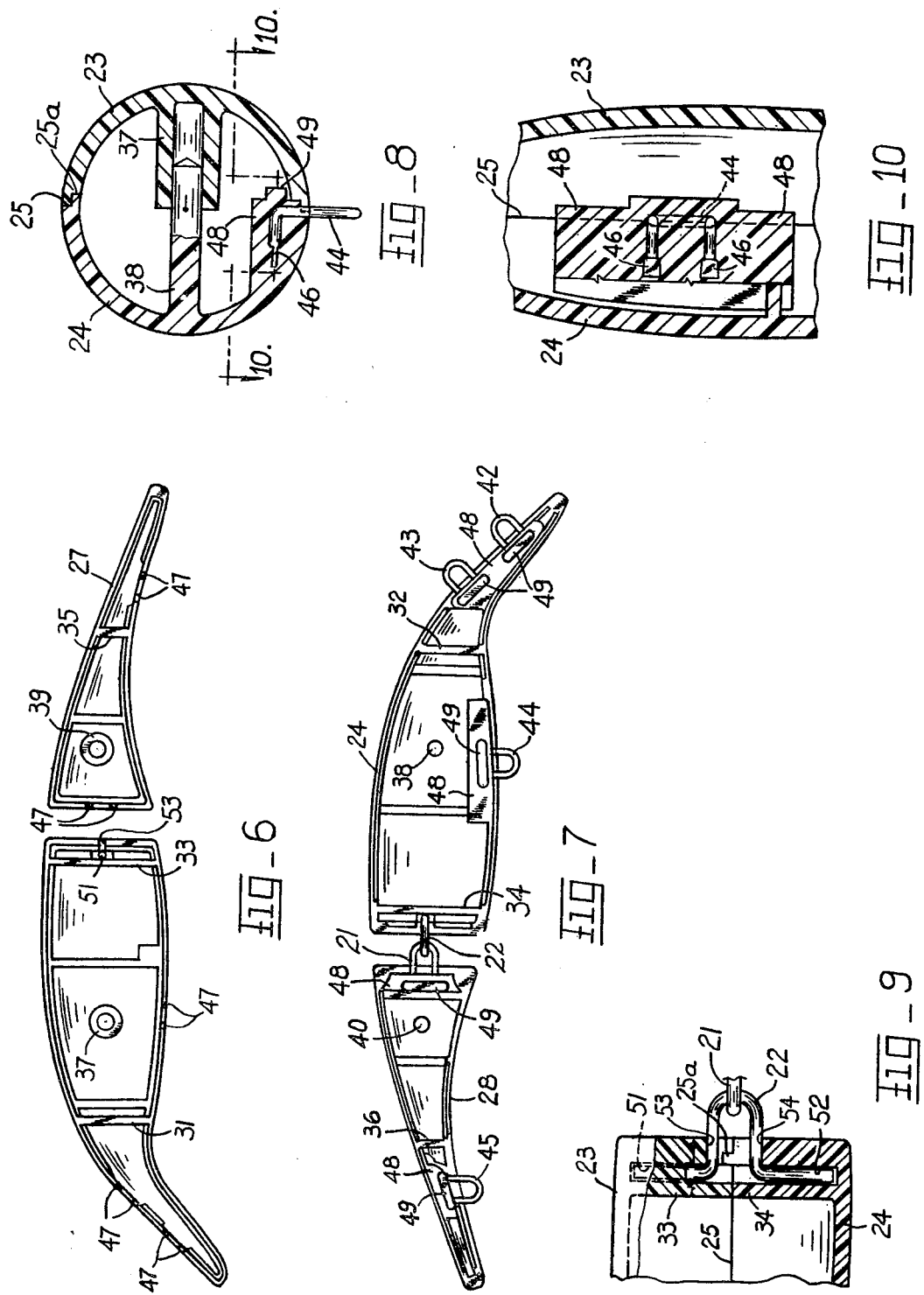

FISHING LURE

My invention relates to fishing.

The principal object of my invention is the provision of improvements pertaining to fishing lures which, inter alia, make them better made and more effective in attracting fish.

The foregoing object of my invention and the advantages thereof will become apparent during the course of the following description, taken in conjunction with the accompanying drawings, in which:

FIGS. 1–5 are, respectively, side elevational, top and bottom plan, and opposite end elevational views of a fishing lure embodying my invention;

FIGS. 6–9 are sectional views of the structure of FIGS. 1 and 2 taken, respectively, on the lines 6—6, 7—7, 8—8 and 9—9 thereof; and FIG. 10 is a sectional view of the structure of FIG. 8 taken on the line 10—10 thereof.

Referring to the drawings in greater detail, 20 generally designates the embodiment of fishing lure shown therein which, in this instance, is made of front and rear body parts joined together by interlocked loops 21 and 22. Each body part, in this instance, is molded of rigid synthetic resin or plastic and in two halves cemented and fitted together by a double tongue construction along a central longitudinal joining line. The two halves of the front body part are designated 23 and 24 and the joining line therefor 25. Each double tongue construction forms interengaging shoulders, as shown and indicated at 25a in FIG. 8, for the front body part. The two halves of the rear body part are designated 27 and 28 and the joining line therefor 29. Each body part is hollow and provided with integrally formed interior walls which strengthen the same. Some of the interior walls form water-tight compartments for the body part such as the walls 31,32 and 33,34 for the front body part and the walls 35,36 for the rear body part. Each body part is provided with interengaging interior members which are pressed together when two halves are joined. Said members, in this instance, are in the form of laterally projecting pipe and shafts designated 37,38 and 39,41 respectively, for the front and rear body parts. The pressed together pipes and shafts 37,38 and 39,41 greatly enhance the strength and solidity with which the halves are held together to form the respective body parts.

The front body part is provided with three metal loops 42, 43 and 44 in addition to the metal loop 22 and the rear body part is provided with another metal loop 45 in addition to the metal loop 21. The metal loops 42,43 are used for attaching to a fishing line and the metal loops 44,45 are used for attaching to multipronged hooks H as shown. The projecting loops 44 and 45 disposed on the underbellies of the two body parts 24 and 28, respectively, are spaced apart from each other a sufficient distance, as shown in FIGS. 1–3, so that the two hooks H cannot tangle with each other. All of the metal loops, with the exception of the metal loop 22, are embedded in the halves 24 and 28 during the process of injection molding of the respective half.

To enhance the embedment of each metal loop, the legs thereof are each bent at right angles so that the free ends of said legs are disposed in a plane at right angles to that of the non-bent portion containing the loop. Said free ends are coined, as shown and indicated at 46, in FIGS. 8, and 10, to enlarge them in the plane in which they are disposed. The non-bent portion of the embedded metal loops are disposed in the plane of the corresponding joining lines 25 or 29 and for this purpose the halves 23 and 27 are provided with pairs of slots as shown and indicated at 47 to accommodate each said metal loop. In addition, the body of the plastic in which said free ends are embedded is enlarged in the area surrounding them as shown and indicated at 48. Also, one or more second enlargments 49 of the body of the plastic are formed on the outside of each of the enlargements 48 opposite the free ends of said legs. The coining 46 of said free ends and the enlargements 48 and 49 serve to enhance the retention of the metal loops in the respective body part. The metal loop 22 is bent differently than the other metal loops, i.e. the legs therefor are each singly bent at right angles so that they are disposed in the same plane as that of the non-bent portions containing the loop. The metal loop 22 is inserted in the front body part during assembly thereof and after the rear body part is completely assembled. Slots 53 and 54 are provided in the body parts 23 and 24 to accommodate the loop 22. During the fitting of the two halves 23 and 24 together prior to cementing thereof to form the front body part, the metal loop 21 is threaded into the metal loop 22 and the free ends of the latter are inserted into apertures 51 and 52 formed in the halves 23 and 24, respectively. Said apertures 51 and 52 are filled with liquid cement prior to insertion of the free ends of the metal loop 22.

It will thus be seen that there has been provided by my invention improvements in a fishing lure in which the object hereinabove set forth, together with many throughly practical advantages, has been successfully achieved. While a preferred embodiment of my invention has been shown and described, it is to be understood that variations and changes may be resorted to without departing from the spirit of my invention as defined by the appended claims. For example, each body part may be molded of rigid plastic in one piece of structural foam.

What I claim is:

1. Improvement in a fishing lure having a molded body part and a projecting attaching loop, said improvement comprising said attaching loop being a wire member having a loop portion and free end portions forming two legs, said legs being bent in the same direction at right angles to the plane of said loop portion, said legs being coined to enlarge them in the plane in which they are disposed, said loop portion projecting from said body part at two locations so that it cannot be pulled or twisted open, said coined ends on the two legs and the two right angled bends being embedded in said body part to enhance the retention of said attaching loop in said body part.

2. Improvement as claimed in claim 1, said fishing lure being a jointed fishing lure having a second molded body part having a second projecting attaching loop, the two body parts being hinged together by said first mentioned attaching loop and said second attaching loop being interlocked via their loop portions, said second molded body part being hollow and comprising two halves fitted and joined together along a central longitudinal joining line, said second attaching loop inserted into said halves of said second body part, whereby the loop portion thereof spans said central longitudinal joining line.

3. Improvement as claimed in claim 1, said body part being hollow and comprising two halves fitted and joined together along a longitudinal joining line, the loop portion said attaching loop being disposed in the plane of said joining line, and said body part being provided with interengaging interior members in the form of a pipe and shaft which engage when the two halves are joined, thereby to assist in alignment of the two halves during assembly thereof and to enhance the strength and solidity with which said halves are held together.

4. Improvement in a jointed fishing lure having first and second molded body parts having, respectively, first and second projecting attaching loops, said body parts being hinged together by said attaching loops being interlocked via their loop portions, said improvement comprising each said body part being hollow and comprising two halves fitted and joined together along a central longitudinal joining line, said first attaching loop being embedded in one of the halves of said first body part said second attaching loop inserted into the two halves of said second body part, whereby the loop portion thereof spans said central longitudinal joining line.

5. Improvement in a jointed fishing lure having first and second body parts having respectively, first and second projecting attaching loops, said body parts being hinged together by said attaching loops being interlocked via their loop portions, said improvement comprising each said body part being hollow and comprising two halves fitted and joined together along a central longitudinal joining line, said first attaching loop embedded in one of the halves of said first body part, said second attaching loop being a wire member having a loop portion and free end portions forming two legs, said legs being bent in opposite directions to each other at right angles so that they are disposed in the same plane as that of said loop portion, said second attaching loop inserted into the two halves of said second body part whereby the loop portion thereof spans said central longitudinal joining line.

* * * * *

UNITED STATES PATENT AND TRADEMARK OFFICE
CERTIFICATE OF CORRECTION

PATENT NO. : 4,188,743
DATED : February 19, 1980
INVENTOR(S) : Carl Nothdurft

It is certified that error appears in the above—identified patent and that said Letters Patent is hereby corrected as shown below:

Column 2, lines 58 and 59 insert a hyphen between "first" and "mentioned".

Column 2, line 59, delete "and", first occurrence.

Column 3, line 2, between "portion" and "said" insert -- of --.

Column 3, line 19, between "part" and "said" insert a comma.

Column 4, line 4, between "having and "respectively" insert a comma.

Signed and Sealed this

Eleventh Day of November 1980

[SEAL]

Attest:

SIDNEY A. DIAMOND

Attesting Officer

Commissioner of Patents and Trademarks